United States Patent

[11] 3,612,350

[72] Inventors James Morkoski
 Clarendon Hills;
 Otto E. Johnson, Hinsdale; Gordon R.
 O'Neil, Westmont, all of Ill.
[21] Appl. No. 2,012
[22] Filed Jan. 12, 1970
[45] Patented Oct. 12, 1971
[73] Assignee International Harvester Company
 Chicago, Ill.

[54] PLANTER WITH RADIAL OSCILLATABLE ROD SEED GRIPPER
 5 Claims, 5 Drawing Figs.

[52] U.S. Cl. .................................................... 221/219
[51] Int. Cl. ................................................... A01c 9/00
[50] Field of Search .......................................... 221/217,
 219; 111/77

[56] References Cited
 UNITED STATES PATENTS
 640,470 1/1900 Jewett .......................... 221/219

Primary Examiner—Samuel F. Coleman
Attorney—Floyd B. Harman

ABSTRACT: A rotatable seed selecting wheel for a planter comprises a disc having circumferentially spaced radially disposed seed selecting members each having a seed receiving finger or pad projecting therefrom in the direction of rotation of the disc, the finger portions of said members being rotatable with the disc through a seed supply and said members being axially rockable against spring bias by actuating means to an open position to receive and grip a seed between the pad and the disc, the seed being discharged after a predetermined rotation of the seed wheel.

INVENTORS
JAMES MORKOSKI
OTTO E. JOHNSON
GORDON R. O'NEIL

ATT'Y

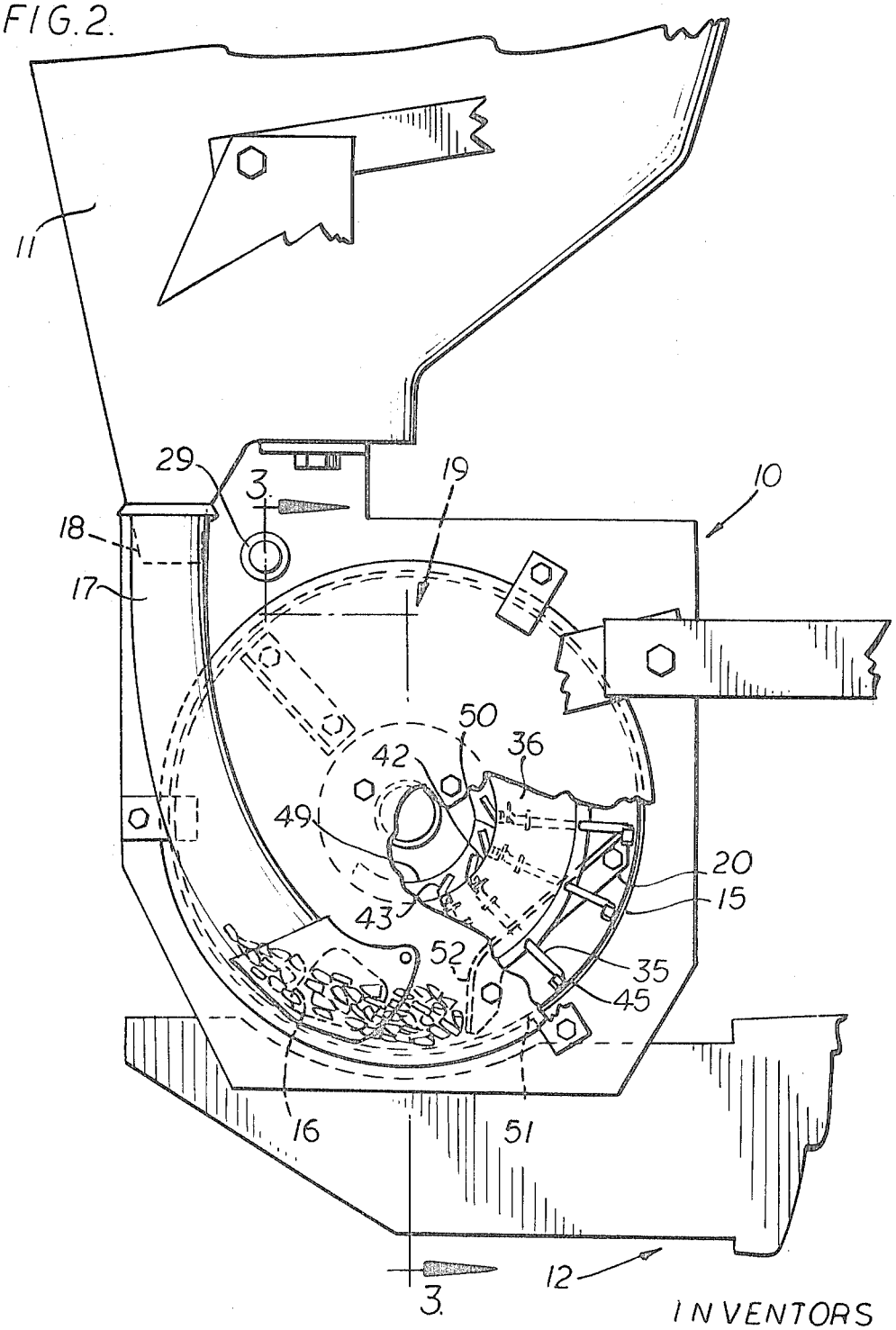

INVENTORS
JAMES MORKOSKI
OTTO E.JOHNSON
GORDON R.O'NEIL

ATT'Y

3,612,350

PLANTER WITH RADIAL OSCILLATABLE ROD SEED GRIPPER

BACKGROUND OF THE INVENTION

This invention relates to planters and particularly to improved seed metering apparatus therefor.

Conventional planters of the seed plate type are incapable of meeting the challenges of the trend toward use of seed of varying size, such as ungraded corn. For many years, corn seed supplied to the farmer for planting has been graded to a uniform size, and planter manufacturers have offered the farmer his choice of a large number of celled seed plates from which he can select the cell size which fits his seed. The success of a planter adapted for use with ungraded seeds, or with a mixture of different kinds of seeds, depends on its capability of accurately selecting and dispensing the desired number of seeds at spaced locations in the ground, reference having been made in copending U.S. application Ser. No. 2,011, filed Jan. 12, 1970, to a number of attempts which have been made to design planters to accomplish this purpose.

An object of the present invention is the provision of an improved planter for metering and dispensing seeds from a supply in which there are variations in seed size.

Another of the invention is the provision of a novel planter seed wheel rotatable in a seed supply, wherein spring biased fingers open to receive and close to grip a selected seed, and wherein a group of such fingers are mounted on the wheel by means accommodating simultaneous circumferential shifting of the fingers.

A further object of the invention is the provision of a rotatable seed wheel comprising a disc having circumferentially spaced spring biased seed selecting fingers mounted on opposite faces thereof wherein novel means are provided for securing the seed selecting members to the disc whereby the members on one face of the disc may be shifted circumferentially with respect to the members on the other face of the disc to optionally accommodate drilling or hill dropping.

DESCRIPTION OF THE DRAWINGS

FIG. 2 is an enlarged diagrammatic view, with parts removed, of a portion of the structure shown in FIG. 1;

DESCRIPTION OF THE PREFERRED EMBODIMENT

Figure 1:
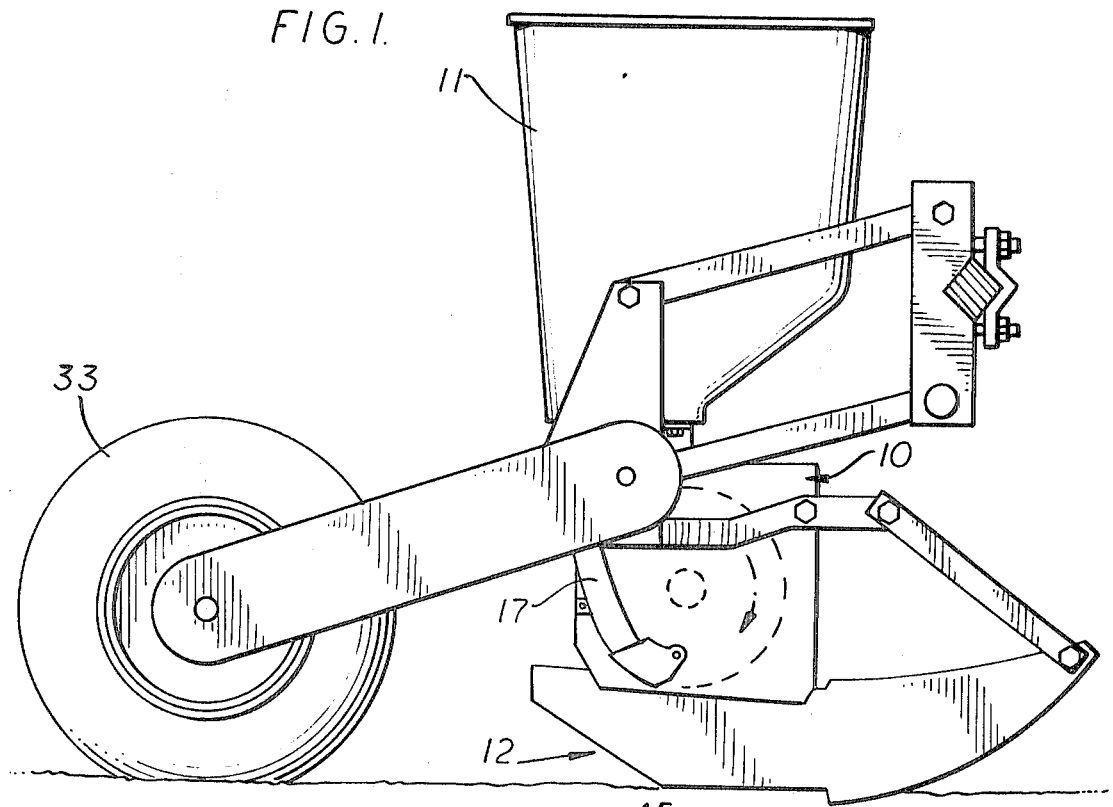
FIG. 1 diagrammatically illustrates a side elevational view of a portion of a planter unit having seed selecting and dispensing means therein incorporating the features of this invention.

A housing 10 forms a part of the supporting framework for the planter mechanism of this invention, and carries at its upper end a seed hopper 11 and at its lower end a furrow opener 12.

Housing 10 comprises sideplates 13 and 14 and an arcuate closure 15 having a bottom portion to which seed is directed through openings 16 in walls 13 and 14, seed being directed thereto through guide tubes 17, connected to spouts 18 through which seed is discharged from the hopper 11.

A seed wheel 19 is mounted in housing 10 between plates 13 and 14 with its lower peripheral portion disposed in the seed supply provided in the bottom of the housing. Seed wheel 19 comprises a disc 20 having a hub 21 secured to one end of a shaft 22 rotatable in a bearing 23 extending through an opening in wall 13 and retained therein by flange members 24 and 25 affixed to wall 13 by bolts 26.

The end of shaft 22 has secured thereto a sprocket wheel 27 drivingly connected to another sprocket wheel 28 affixed to a drive shaft 29 rotatable in bearings 30 and 31 carried by a sleeve 32 mounted in the walls 13 and 14 of the housing 10.

Shaft 29 is driven by any suitable means such as the ground engaging wheel 33 shown in FIG. 1 and forming part of the planter unit. Sprocket wheels 27 and 28 are a suitable drive chain therefor are covered by a shield 34 mounted on wall 13.

The rotatable disc or plate 20 of seed wheel 19 forms the base for the mounting on one face or side thereof, of a plurality of elongated, radially disposed seed selecting members 35, held against the adjacent face of disc 20 by a retainer plate in the form of an annulus 36 having circumferentially spaced radial grooves 37 extending to the outer periphery 38 thereof to receive the seed selecting members 35 for rocking about their axes relative to disc 20.

Figure 4:
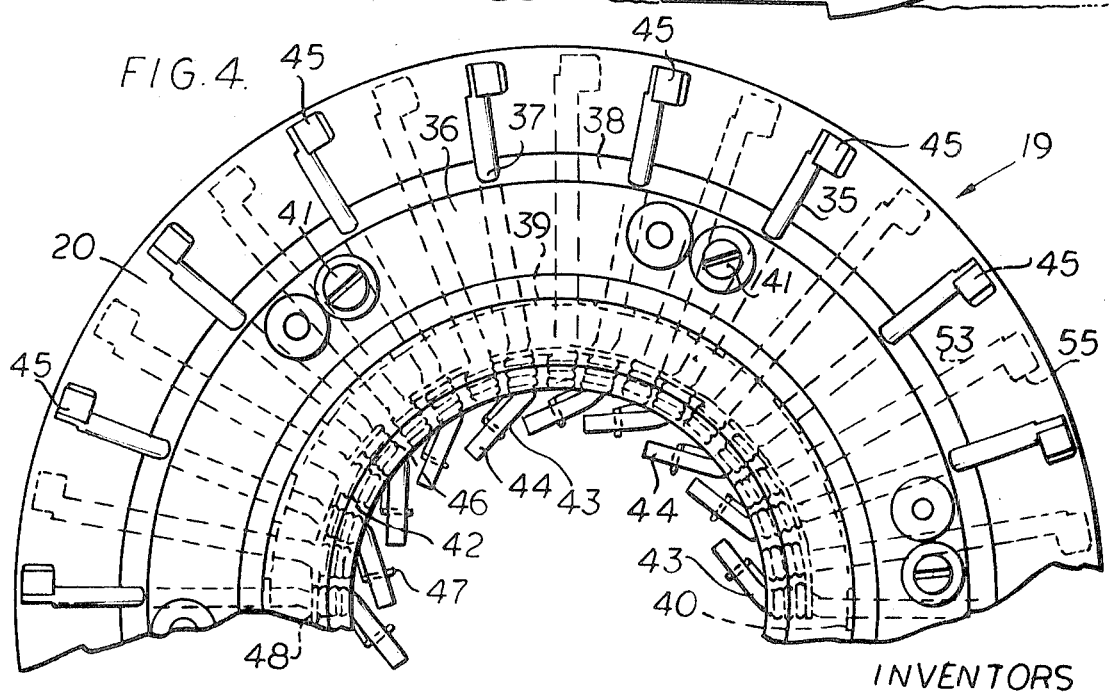
FIG. 4 shows a portion of one face of a seed wheel according to this invention.

The members 35 are located in their radially disposed positions by the provision on the inner surface of retainer 36 of a groove 39 (see FIG. 4) in which is received a projection or lug 40 mounted on the seed selecting member. Retainer 36 is removably secured to disc 30 by the provision of registering openings in the retainer and the disc in which bolts 41 are insertable.

The inner ends of members 35 projecting beyond the inner periphery 42 of the annular retainer are bent away from the adjacent face of the disc 20 and tangentially rearwardly with respect to the direction of rotation of the seed wheel, as indicated by the arrow in FIG. 1, to form lever arms 43 having flattened camming faces 44.

The radially outer ends of members 35 terminate adjacent the periphery of disc 20, and projecting from their leading edges at their outer ends are seed gripping pads or fingers 45. These seed gripping fingers 45 are biased toward the face of the disc by the provision of a torsion spring 46 surrounding a portion of member 35 and having one end 47 anchored to lever 43 and the other end 48 engaging the face of the disc.

Figure 5:
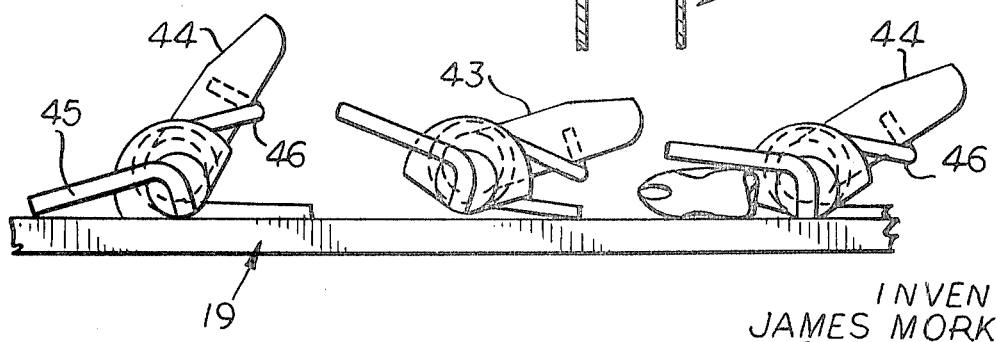
FIG. 5 is an enlarged diagrammatic detail of a portion of the seed wheel of this invention.

The cam surfaces 44 of lever arms 43 define a circular path, and during rotation of the seed wheel these cam surfaces successively engage a cam member 49, best shown in FIG. 2, mounted in the housing 10 to swing lever 43 and rock member 35 in a direction to deflect finger pad 45 from the face of the disc in the manner indicated in FIG. 5.

At the time cam member 49 actuates the seed selecting member to open or deflect finger 45, that portion of the seed wheel is passing through the seed supply at the bottom of the housing and a seed enters the space between the finger and the plate or disc.

When a finger 45 having a seed received therebetween and the face of the plate reaches a point in the rotating of the wheel where the camming surface 44 moves out of engagement with cam member 49, the bias of spring 46 causes the finger to grip the seed in the manner shown in FIG. 5. Seed gripped by each of the fingers 45 rotates with the seed wheel until the camming surfaces 44 come into engagement with a discharge cam surface 50 forming part of cam member 49, again deflecting finger 45 away from the disc and discharging the seed through an outlet 51 in the bottom of the housing.

In order to prevent seed not picked up by members 35 from being carried around by the speed of rotation of the seed wheel and falling through outlet 51, a diverter 52 is provided comprising flexible curved members, preferably of rubber, engageable with opposite faces of the disc, to block the outlet 51 and direct the seed back into the supply.

Figure 3:
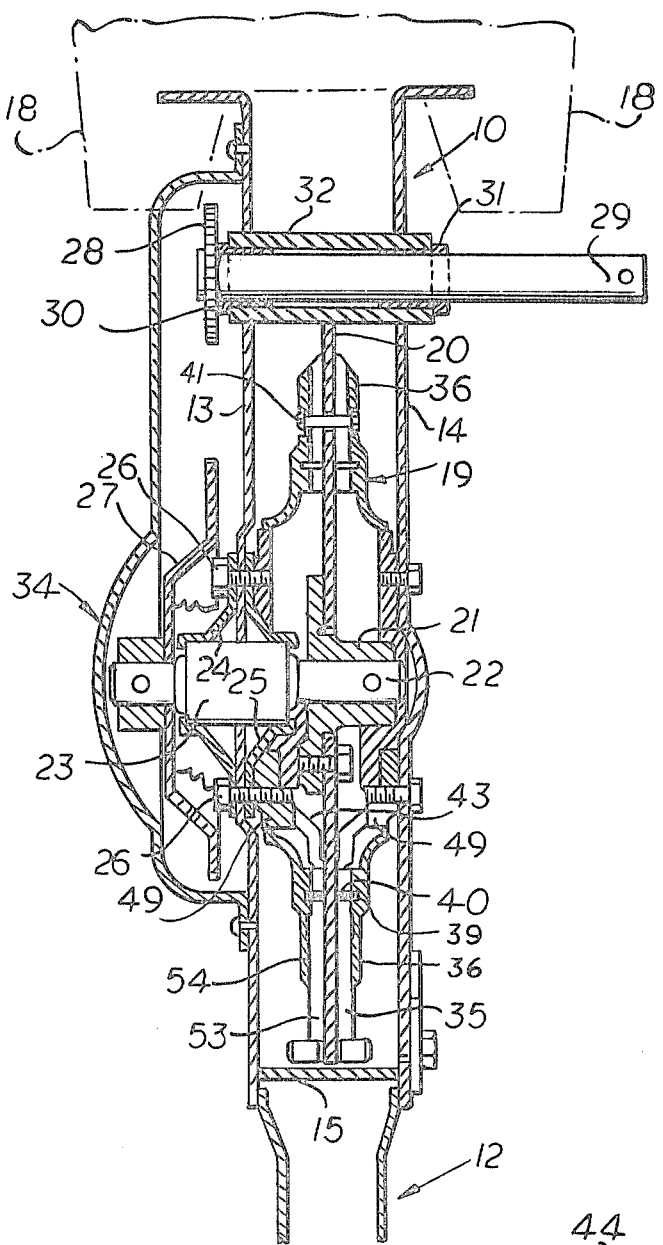
FIG. 3 is a section with parts removed taken on the line 3—3 of FIG. 2.

Each of the seed selecting members 35 is adapted to pick up from the seed supply a single seed and to discharge it from outlet 51, 18 seed selecting members being provided on one face of disc 20, as indicated in FIG. 3. Thus, 18 single seeds are drilled in the furrow formed by the furrow opener 12 at evenly spaced intervals for each revolution of the seed wheel.

In order to hill drop two seeds at a time a duplicate set of seed selecting members 53, clearly shown in FIG. 3, is mounted on the opposite side of disc 20 in alignment, axially of the disc, with fingers 35. The seed selecting members 53 are positioned and locked in place on disc 20 by another annular retainer plate 54 and secured to the disc by the same insertable bolt means 41 holding retainer 36 to the disc. Similar torsion springs 46 are utilized for the fingers 53 and another pickup finger opening cam member 49 is provided to simultaneously engage the camming pads at the inner ends of members 53, so that a seed is picked up simultaneously by adjacent pickup fingers 45 and 55 (see FIG. 4) of members 35 and 53, respectively. The seeds picked up by aligned pairs of fingers 45 and 55 are thus carried around by the wheel, another discharge cam surface 50 being provided to simultaneously open the pairs of fingers 45 and 55 to drop two seeds at a time into the furrow.

The retainers 36 and 54 are circumferentially displaceable with respect to disc 20, and one retainer is displaceable relative to the other. As indicated in FIG. 3, when it is desired to double the number of individual seed that can be discharged from the seed wheel 19, bolt 41 is removed and one of the retainers, for example retainer 54, is circumferentially displaced relative to the other.

In the latter case, with 18 seed selecting members on one side of the disc alternating with 18 seed selecting members on the opposite side of the disc, 36 individual seeds will be planted at evenly spaced intervals for each revolution of the seed wheel.

The preferred embodiment of the seed planting apparatus of this invention is believed to be adequately illustrated in the drawings, and the construction and operation thereof should be clearly understood from the foregoing description.

What is claimed is:

1. In a planer, a housing having a seed supply, a seed wheel comprising, a disc rotatably mounted in the housing in contact with the seed supply, circumferentially spaced radially disposed seed selecting members mounted on the rotatable disc for rocking about their axes relative to the disc, said seed selecting members are rockably anchored to said disc by means of a plate secured to the disc having an outer diameter less than that of the disc and having radial grooves receiving and accommodating the rocking of said members, a seed pickup finger forming part of each of said rockable members, and extending laterally therefrom, said fingers project from said seed selecting members in the direction of rotation of the disc, a cam having a descending ramp mounted in the housing operatively engageable with said members to successively rock them about their axes in one direction in response to rotation of the wheel to deflect said fingers from the face of the rotatable disc as the latter traverses said seed supply to receive and hold a seed between each finger and said rotatable disc, said cam having an ascending ramp circumferentially spaced from said descending ramp, torsion spring means mounted on and anchored at one end to each of said rockable members and having its other end engaging the disc to yieldably oppose the rocking movement of each of said seed selecting members in said one direction, the inner ends of said seed selecting members being bent outwardly from the adjacent face of the disc to form means serving as levers, said outwardly bent inner ends directed tangentially in a direction opposite said direction of rotation, the descending ramp of said cam being successively engageable with the inner ends of said members during rotation of the seed wheel to rock said members against the bias of said torsion spring means and successively deflect and release said fingers to cause the latter to receive and hold a seed against the face of the disc and the ascending ramp of said cam operatively engageable with said inner ends to again deflect said fingers to dislodge the seed held thereby.

2. The invention set forth in claim 1, wherein radial projections are provided on said seed selecting members and means serving as mating groove means is formed in said plate to receive said projections.

3. The invention set forth in claim 2, wherein the inner ends of said seed selecting members define a circle and said plate is in the form of an annulus having an inner diameter greater than that of said circle to expose said inner ends of said members.

4. In a planter comprising a rotatable disc having radially disposed axially rockable seed selecting members mounted on opposite faces thereof, the combination of a retaining plate mounted on at least one face of said disc for anchoring the members on that face to the disc and having a diameter less that that of the disc, said plate having peripheral openings therein to rockably receive said members, said plate being rotatable with said members relative to the disc to optionally shift the seed selecting members on said one face of said disc from positions circumferentially displaced with respect to the seed selecting members on the other face of said disc to positions in which the seed selecting members on opposite faces of said disc are in alignment axially of the disc, and means for securing the plate to the disc in either of said positions.

5. The invention set forth in claim 4, wherein said securing means includes circumferentially spaced pairs of openings formed in said plate and openings formed in said disc optionally registrable with either of the openings of each pair and insertable means receivable in the openings in the disc and in either of the openings in said plate.